(12) United States Patent
Devireddy

(10) Patent No.: US 11,340,764 B2
(45) Date of Patent: May 24, 2022

(54) CROSS-DOMAIN SHORTLISTING

(71) Applicant: Veeresh Devireddy, Santa Clara, CA (US)

(72) Inventor: Veeresh Devireddy, Santa Clara, CA (US)

( * ) Notice: Subject to any disclaimer, the term of this patent is extended or adjusted under 35 U.S.C. 154(b) by 28 days.

(21) Appl. No.: 16/370,925

(22) Filed: Mar. 30, 2019

(65) Prior Publication Data

US 2019/0384467 A1 Dec. 19, 2019

Related U.S. Application Data

(60) Provisional application No. 62/685,953, filed on Jun. 16, 2018.

(51) Int. Cl.
| | | |
|---|---|---|
| *G06F 3/0484* | (2022.01) | |
| *H04L 101/618* | (2022.01) | |
| *H04L 67/10* | (2022.01) | |

(52) U.S. Cl.
CPC ........ *G06F 3/0484* (2013.01); *H04L 61/6018* (2013.01); *H04L 67/10* (2013.01)

(58) Field of Classification Search
CPC ... G06F 3/0484; H04L 61/6018; H04L 67/10; H04L 67/02
USPC ........................................................ 715/744
See application file for complete search history.

(56) References Cited

U.S. PATENT DOCUMENTS

| | | | | |
|---|---|---|---|---|
| 7,243,122 B2 * | 7/2007 | Acharya | ............. | G06F 16/9574 709/203 |
| 8,612,312 B1 * | 12/2013 | Edwards | ............ | G06Q 30/0633 705/26.8 |
| 8,806,376 B2 * | 8/2014 | Park | ...................... | H04W 88/02 715/705 |
| 9,268,867 B2 * | 2/2016 | O'Shaughnessy | ...... | H04L 67/26 |
| 10,037,538 B2 * | 7/2018 | Graham | ................. | G06Q 50/01 |
| 10,769,672 B2 * | 9/2020 | Wical | ................. | G06Q 30/0257 |
| 2002/0112012 A1 * | 8/2002 | Jones | ..................... | G06F 16/955 707/E17.112 |
| 2008/0282196 A1 * | 11/2008 | Park | .................. | H04M 1/72445 715/838 |
| 2012/0143720 A1 * | 6/2012 | Moser | .................... | G06Q 30/02 705/26.8 |
| 2013/0204739 A1 * | 8/2013 | Friedman | ............... | G06Q 30/02 705/26.7 |
| 2015/0095847 A1 * | 4/2015 | Kleinhout | ............. | G06F 3/0483 715/838 |
| 2015/0120493 A1 * | 4/2015 | Mokshagundam | ......................... | G06Q 30/0631 705/26.7 |

(Continued)

OTHER PUBLICATIONS

Devireddy, Veeresh; "Smarty List" Website: https://web.archive.org/web/20161004194843/https://smartylist.com/ (Year: 2016).*

(Continued)

*Primary Examiner* — Sheree N Brown

(57) ABSTRACT

A cross-domain real-time shortlisting method is provided. The method includes instantaneous identification of relevant information on the user interface like the web browser, and uses a system to inject actionable buttons in an overlay on the website for shortlisting. Further, the relevant information can be shortlisted dynamically while the user is browsing. Thereafter, the shortlisted information will be available in one place as a universal list and accessible across other websites with consistent experience.

6 Claims, 4 Drawing Sheets

(56) References Cited

U.S. PATENT DOCUMENTS

2016/0299973 A1* 10/2016 Oakeson ............. G06F 16/9535
2019/0370401 A1* 12/2019 Grant ..................... H04W 4/70

OTHER PUBLICATIONS

Y. LeCun, Y. Bengio and G. Hinton, "Deep learning", Nature, vol. 521, No. 7553, pp. 436-444, May 2015. (Year: 2015).*

B.M. Lake, T.D. Ullman, J.B. Tenenbaum and S.J. Gershman, "Building machines that learn and think like people", Behav. Brain Sci., vol. 40, 2017. (Year: 2017).*

Gabriel Stanovsky, Jessica Ficler, Ido Dagan and Yoav Goldberg, Getting more out of syntax with props, 2016. (Year: 2016).*

Mohamed Yahya, Steven Euijong Whang, Rahul Gupta and Alon Y. Halevy, "Fact extraction for nominal attributes", EMNLP, 2014. (Year: 2014).*

Gabriel Stanovsky and Ido Dagan, Creating a large benchmark for open information extraction, 2016. (Year: 2016).*

Janara Christensen, Mausam, Stephen Soderland and Oren Etzioni, "An analysis of open information extraction based on semantic role labeling", KCAP, 2011. (Year: 2011).*

Lin Gui, Yu Zhou, Ruifeng Xu, Yulan He and Qin Lu, Learning representations from heterogeneous network for sentiment classification of product reviews, vol. 124, No. 15, May 2017. (Year: 2017).*

A. Cano, A. Zafra and S. Ventura, "An interpretable classification rule mining algorithm", Inf Sci., vol. 240, pp. 1-20, Aug. 2013. (Year: 2013).*

Omer Levy and Yoav Goldberg, "Dependency-based word embeddings", In ACL, 2014. (Year: 2014).*

Gabriel Stanovsky, Julian Michael, Luke Zettlemoyer and Ido Dagan, "Supervised Open Information Extraction", Proceedings of NAACL-HLT, 2018. (Year: 2018).*

R. Piltaver, M. Lustrek and M. Gams, Multi-objective learning of accurate and comprehensible classifiers—a case study, 2014. (Year: 2014).*

Marco Pota, Massimo Esposito and Giuseppe De Pietro, Designing rule-based fuzzy systems for classification in medicine, vol. 124, No. 15, May 2017. (Year: 2017).*

Kerr-Wilson and Jeremy, Fuzzy Rule-Based Systems: Design Analysis and Applications, 2019. (Year: 2019).*

Niranjan Balasubramanian, Stephen Soderland, Mausam and Oren Etzioni, "Rel-grams: A probabilistic model of relations in text", In AKBC-WEKEX, 2012. (Year: 2012).*

Janara Christensen, Stephen Soderland, Gagan Bansal and Mausam, "Hierarchical summarization: Scaling up multi-document summarization", ACL, 2014. (Year: 2014).*

Rudolf Schneider, Tom Oberhauser, Tobias Klatt, Felix A. Gers and Alexander Loser, Analysing errors of open information extraction systems, 2017. (Year: 2017).*

Julian Michael, Gabriel Stanovsky, Luheng He, Ido Dagan and Luke Zettlemoyer, "Crowdsourcing question-answer meaning representations", In Proceedings of the Conference, 2018. (Year: 2018).*

* cited by examiner

CROSS-DOMAIN SHORTLISTING

CROSS-REFERENCE TO RELATED APPLICATIONS

The present application relates and claims priority to U.S. provisional patent application No. 62/685,953 filed on Jun. 16, 2018.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

BACKGROUND OF THE INVENTION

Field of the Invention

The present disclosure relates generally to shortlisting of information on the internet browser. More so, the present invention relates to cross-domain shortlisting of information on the internet.

Description of the Related Art

With increasing penetration of the internet across the world, information available on the internet has exploded. User accumulates information from several sources on the internet for various purposes such as journalism, research, education, media coverage, social networking, teamwork collaboration, reviewing of shopping products, or to manage any data that they like or needed while browsing.

Currently, there is no convenient solution to manage the data efficiently and instantaneously in the above fields and contexts. Typically and most often, users would try to save, copy or manage the relevant information, either for local reference or share to collaborate with others. Some examples include saving search results, daily news, favoriting videos and photos, social feeds, products on e-commerce sites, and in general any text or links on the internet.

However, there is nothing to store all of the relevant data in one place as a common Shortlist that acts as a universal list. Also, there is no quick and intuitive way to access and review those set of information among multiple platforms (websites), and yet not being able to control them in one place.

In light of the above-mentioned drawbacks, there exists a need for a solution that allows a user to quickly save and manage multiple patterns of relevant information from various websites.

BRIEF SUMMARY OF THE INVENTION

A primary object of the disclosure is to provide a method of shortlisting relevant information on the internet browser.

Another object of the present disclosure is to provide a method of cross-domain information shortlisting on the internet browser, dynamically without affecting the browser performance, user experience and having control to manage them consistently on those cross-domain websites.

DESCRIPTION OF THE DRAWINGS

Figure 1:
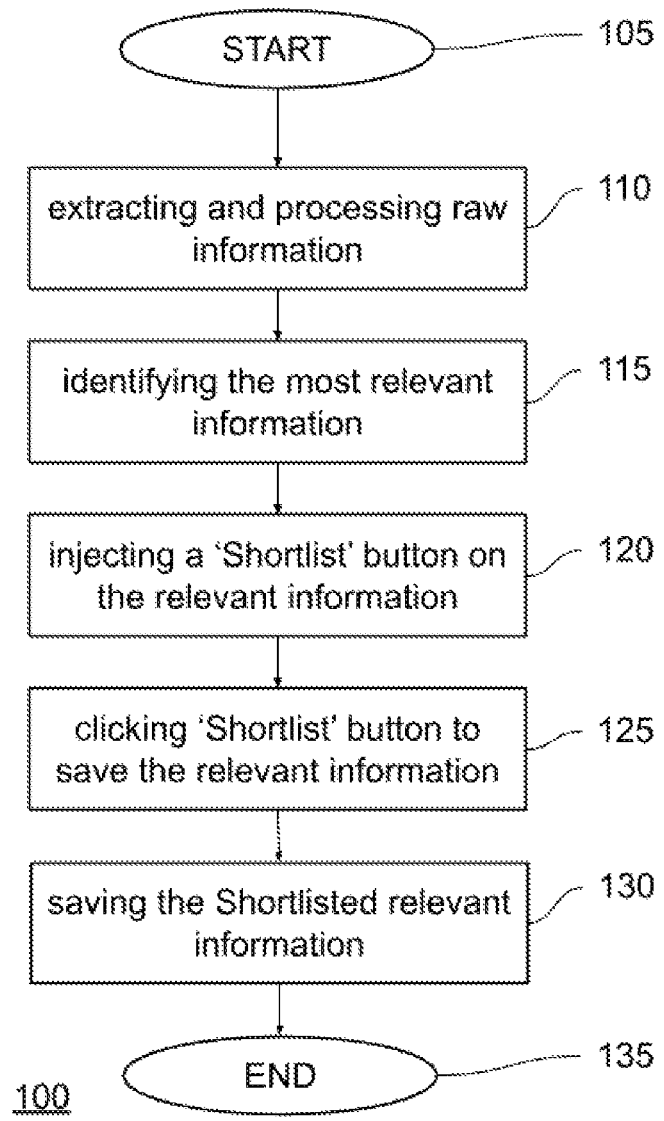
Figure 2:
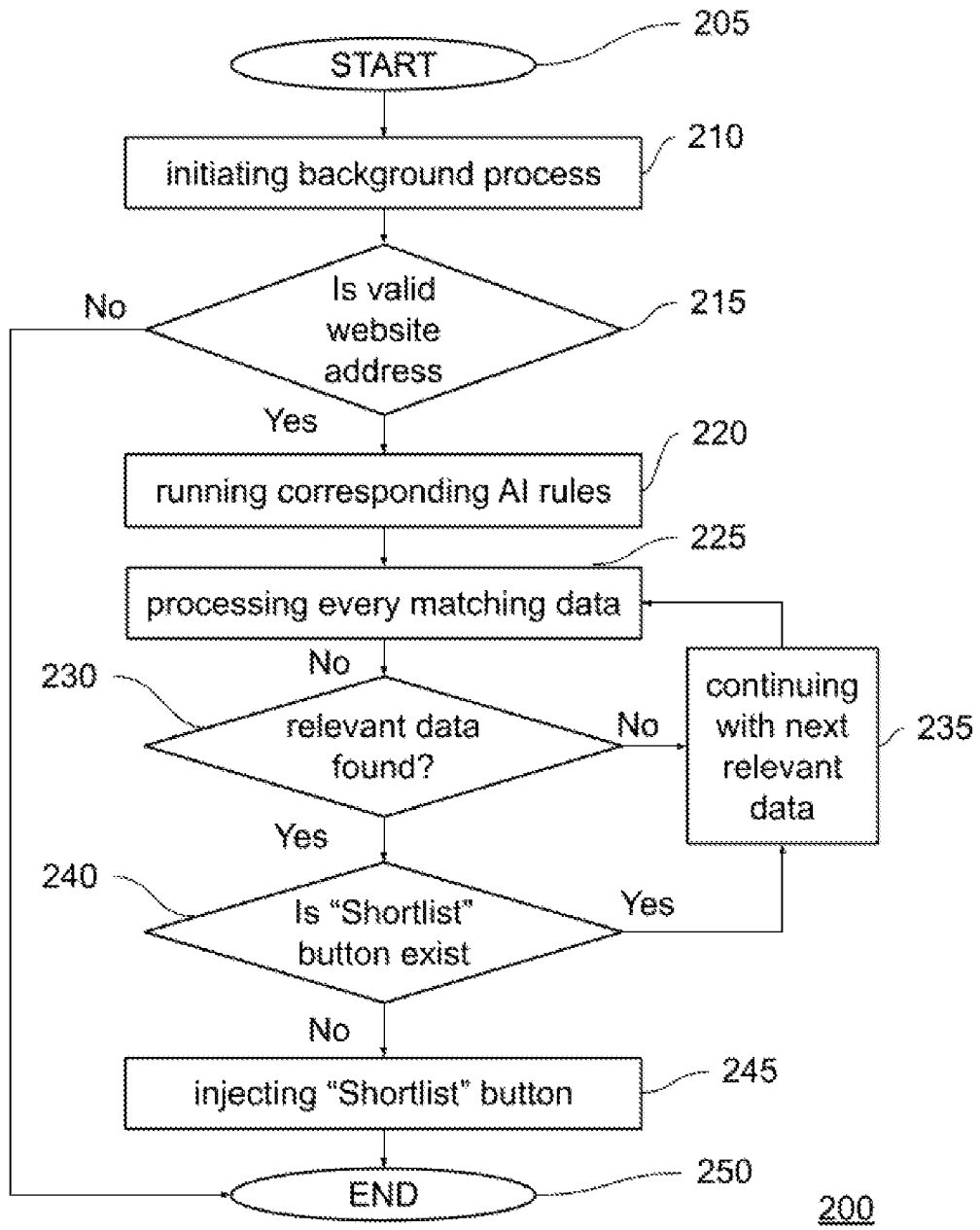
Figure 3:
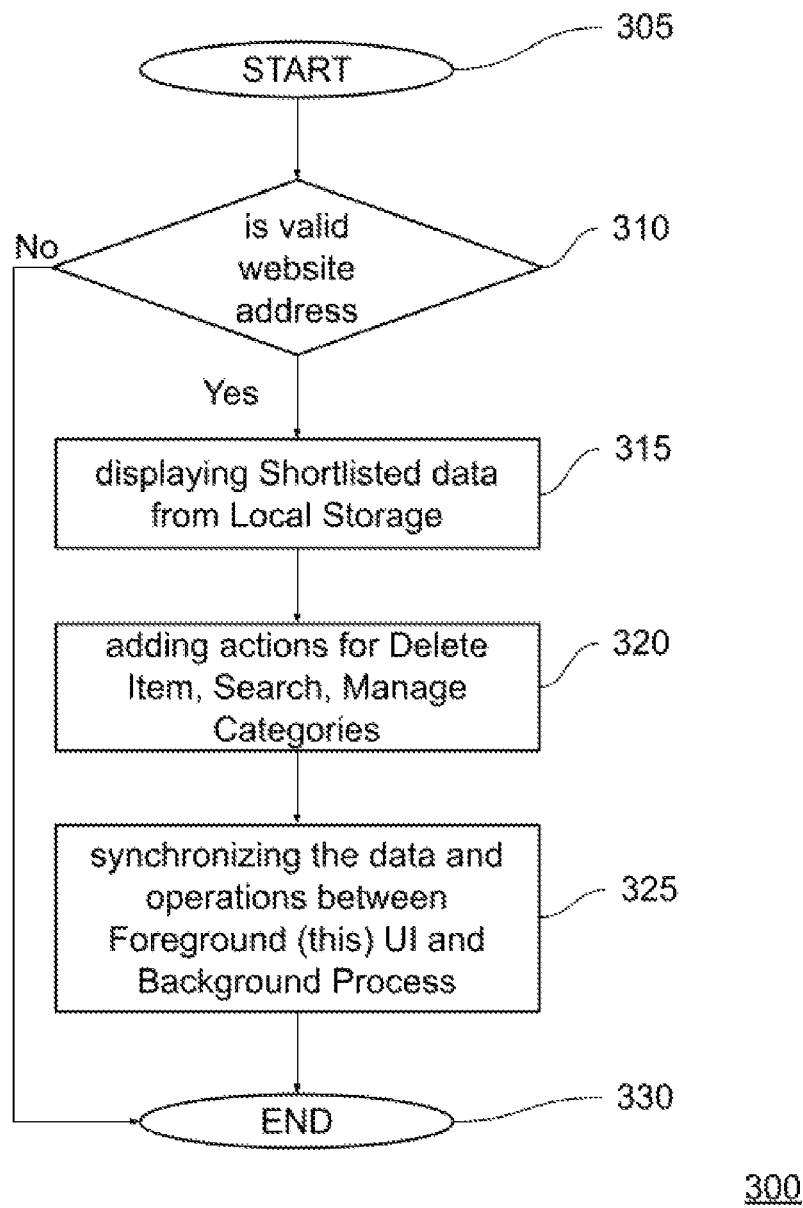
Figure 4:
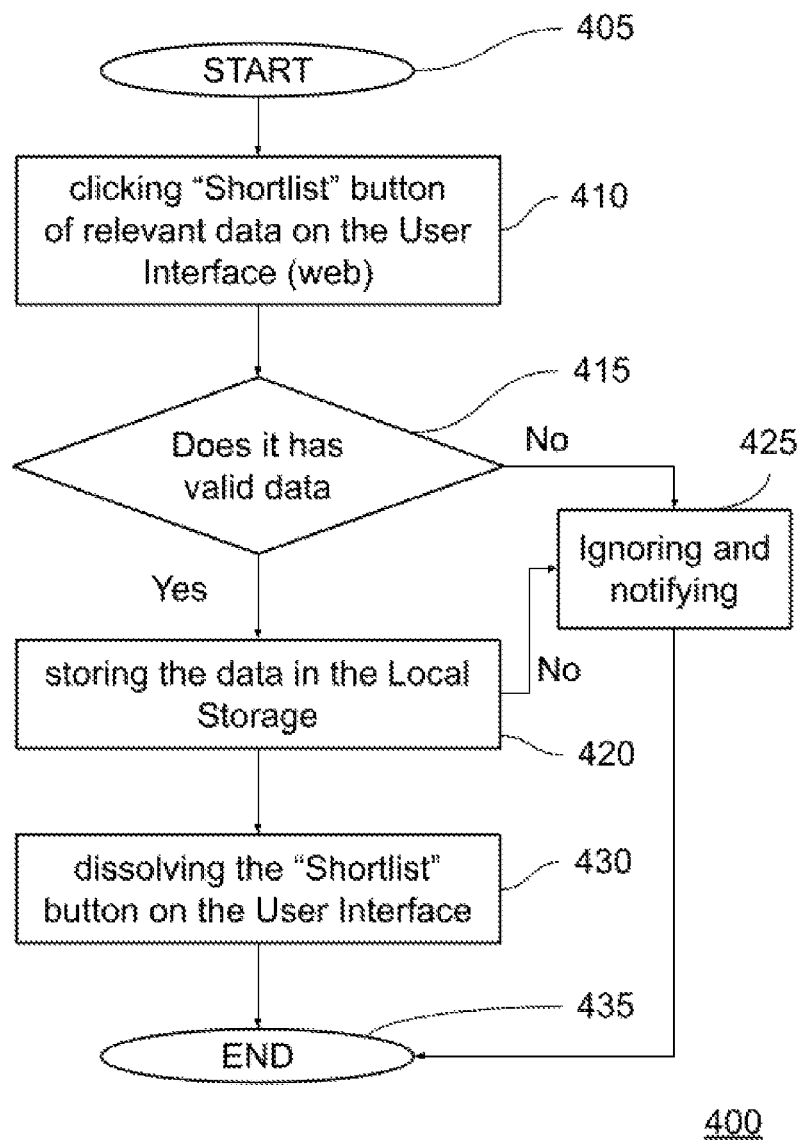

Having thus described the disclosure in general terms, reference will now be made to the accompanying figure, wherein:

FIG. 1 Illustrates a method of cross-domain shortlisting, in accordance with an embodiment of the present disclosure;

FIG. 2 Illustrates a method of data processing and shortlisting, in accordance with an embodiment of the present disclosure;

FIG. 3 Illustrates a method of overlaying shortlisted data, in accordance with an embodiment of the present disclosure; and FIG. 4 Illustrates a method of adding an item into Shortlist, in accordance with an embodiment of the present disclosure.

It should be noted that the accompanying figures are intended to present illustrations of exemplary embodiments of the present disclosure. This figure is not intended to limit the scope of the present disclosure. It should also be noted that the accompanying figure is not necessarily drawn to scale.

DETAILED DESCRIPTION OF THE INVENTION

Reference will now be made in detail to selected embodiments of the present disclosure in conjunction with the accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figure is intended and provided to illustrate embodiments of the disclosure described below and are not necessarily drawn to scale. In the drawing, like numbers refer to like elements throughout, and thicknesses and dimensions of some components may be exaggerated for providing better clarity and ease of understanding.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced items.

FIG. 1 Illustrates a method 100 of cross-domain shortlisting, in accordance with an embodiment of the present disclosure. The method 100 starts at step 105, with a user loading a website on the browser. At step 110, raw information of the website on the user interface (UI) is extracted and processed. Further, at step 115, the most relevant information is identified, in parallel while the user is browsing. In an embodiment of the present disclosure, the relevant information is based on the predefined domain (website name). The user interface can be any website on the internet, and also applicable to any mobile, tablet or other electronic user interfaces. Examples of the relevant information can be daily news, favoriting videos and photos, social feeds, products on e-commerce sites, and in general any text or links on the internet. Each user interface is defined by a predefined domain. For example, relevant information on an e-commerce domain can be defined as product name, price, shipping time, ratings, and so forth. On Youtube, relevant information may be a video. Text and an image could be the relevant information on a news website. It should be understood that type of relevant information from each domain or a group of domains is predefined, and are identified by the Artificial Intelligence (AI) algorithms based on the abstract rules. Abstract Rules are a simple parameters to an Artificial Intelligence system, which use a series of IF-THEN statements that guide a computer to identify, validate and extract information. In an embodiment of the present disclosure, the relevant information is identified by automatic detection based on one or more of HTML data from a server, structure of data, type of data, the position of data on the user interface, loading type, user actions, and so forth.

Thereafter, at step 120, a 'Shortlist' button is injected on the relevant information. The user clicks on 'Shortlist' button to save the relevant information at step 125. For example, a user is browsing an e-commerce website. While browsing, the user likes a product and wants to save it so that he can later compare it with other products on several e-commerce platforms. The user can click the 'Shortlist' button to save the product information. The shortlisted relevant information can be a combination of a title, a short description, an image, a link, a price, rating, visits etc. In another embodiment of the present disclosure, the shortlisted relevant information is tagged by the user. For example, a user may add a 'Home' tag to related products for user's own home.

In an embodiment of the present disclosure, a 'Shortlist' button may dynamically appear on the relevant information on the UI. In another embodiment of the present disclosure, the user can select (by dragging the area) any information on the UI to shortlist, if the 'Shortlist' button is not visible. Here, the system may have ignored it if it doesn't contain all of the necessary meta-data, hence the user is performing this manual action. For this manual shortlisting process, the user need to Right Click (Mouse) on the user interface and then select an option "Add to Shortlist". In an example, the system fails to find relevant information when there are no key data elements like Titles, Links, Image, Price tag etc. For example, a news article without a title, a product without a price tag, or a broken link etc.

Subsequently, at step 130, the shortlisted relevant information is saved in one place on UI as a universal list. This universal list is accessible across a plurality of domains. Referring to the previous example, the shortlisted product information is saved in a universal shortlist. This universal shortlist is accessible across all platforms, devices and domains. For example, a user can shortlist a product on Amazon.com and it is also accessible on Flipkart.com while reviewing other products. In an embodiment of the present disclosure, this universal list is stored locally and then synced to cloud storage periodically. It should be noted that storing the universal list can be implemented in several ways without impacting the scope of the present disclosure. In another embodiment of the present disclosure, the shortlist of items can be shared with other users for collaboration. For example, a user can share all shortlisted information having 'personal' tag with his family members. In an embodiment of the present disclosure, the method 100 allows real-time tagging of text on browser UI by injecting an interface processor as a plug-in to save and manage the life cycle of the relevant information shortlisting as an universal list. The method 100 ends at step 135.

FIG. 2 Illustrates a method 200 of data processing and shortlisting, in accordance with an embodiment of the present disclosure. The method 200 initiates at step 205. The background process (browser plug-in) is initiated at step 210. At step 215, it is checked whether the current website address is valid or not. The validity of the website address is determined based on the syntax, format and if it supported by the system. If the website address is invalid, the method 200 ends at step 250. In case, if the website address is valid, corresponding Artificial Intelligence (AI) rules run at step 220. For example, when the user browses an e-commerce website Amazon.com, then it's corresponding AI rules will get executed within the browser to find relevant products having several formats. Subsequently, every matching data is processed at step 225. Here, the AI rules are pre-defined to find several closest matching data, but not all necessarily be relevant and valid. For instance, matching news data is duplicate, a product may not have a price or its picture. Hence, every matching data will be validated against all conditions and formats to be eligible to shortlist. If no relevant data is found at step 230, the method 200 continues with next relevant data at step 235. Subsequently, every matching data is processed at step 225.

In case relevant data is found at step 230, it is checked whether a 'Shortlist' button exists at step 240. If the 'Shortlist' button is found, the method 200 goes back to step 235, because the matched relevant data already got identified and has its 'Shortlist' button. If the 'Shortlist' button is not found at step 240, then it continues with step 245 to inject the new 'Shortlist' button on the browser UI where the relevant data is found.

FIG. 3 Illustrates a method 300 of displaying shortlisted data as an overlay on the website within the browser UI, in accordance with an embodiment of the present disclosure. The method 300 initiates at step 305. At step 310, it is checked if a valid website address is used. If a valid website address is not used, the method 300 ends at step 330. If valid website address is used, shortlisted data from local storage is displayed at step 315. Further, actions for 'Delete Item', 'Search', 'Manage Categories' and so forth are added at step 320. These are actions or functions offered to a user to manage Shortlisted data on the same page. At step 325, the data and operations are synchronized between foreground UI and background process. For example, any user actions on UI like clicking on 'Shortlist' button on the relevant content, changing the category of the shortlisted item, adding a new category, deleting the shortlisted item etc. will push the updates into the background process. Similarly, any changes in the configuration, importing of shortlisted items will pull the changes from the background process to UI on the foreground. Further, the method 300 ends at step 330.

FIG. 4 Illustrates a method 400 of adding an item into Shortlist, in accordance with an embodiment of the present disclosure. The method 400 initiates at step 405. A user clicks on the "Shortlist" button of the relevant data on the browser user interface (web). For example, the "Shortlist" buttons are placed on the elements or container of the relevant data on the website. For instance, this button can be placed within any HTML tags like Division (<div />), Paragraph (<p />), Span (<span I>) etc, and the "Shortlist" buttons will have an overlay effect so the user can click them independently. It is checked, at step 415, weather the "Shortlist" but contains the necessary valid data. If it has invalid data or failed to get stored, then it will be ignored and notified to the user at step 425. Subsequently, the method 400 ends at step 435.

If valid data is found at step 415, the data is stored in the local storage at step 420. For example, when we shortlist a product on e-commerce site, then its Title, Link, Picture, Price will be stored in the local storage with its unique ID. If the storage fails at step 420, it is ignored and notified to the user at step 425. If successfully stored, then the "Shortlist" button of that particular relevant data item get dissolved on the user interface at step 430, mainly to indicate to user that it has already got shortlisted. The method 400 subsequently ends at step 435.

Present disclosure provides several advantages over existing art. The shortlisting method allows the user to shortlist any relevant data from several websites in one place as an universal list, on the browser as an overlay. Also, the universal list is accessible across platforms and domains.

What is claimed is:

1. A shortlisting method comprising:
   live extraction and processing of information on a website in an User Interface (UI) while a user is browsing to find relevant data using an Artificial Intelligence (AI), by a processor;
   wherein the UI is a browser, provided on a desktop computer, mobile or tablets;
   wherein functionalities of the UI are limited to set of predefined domains;
   identifying the relevant data on the website in the user interface based on the predefined domain and factors, by the processor, wherein said factors include relevance to the predefined domain, format, pattern, type and nature of data;
   wherein the relevant data is identified based on one or more of HTML data from website server, structure of data, type of data, a position of data on the user interface, loading type and user actions;
   wherein the relevant data including text, links, videos and images on the website;
   injecting shortlist buttons dynamically on the identified relevant data in the website, by the processor;
   instantly shortlisting the relevant data on clicking the shortlist buttons by the user on the website, for saving the shortlisted relevant data as an universal list in a local storage on the user interface, by the processor;
   wherein the shortlisted relevant data has one or more of a title, a short description, an image, a link, a price, rating and visits; and
   making the universal list accessible across a plurality of domains by the local storage, thereby enabling cross-domain shortlisting.

2. The shortlisting method as claimed in claim 1, further comprising tagging the shortlisted relevant information by one or more tags, wherein the one or more tags are defined by the user.

3. The shortlisting method as claimed in claim 1, wherein the universal lists are stored locally and periodically synced to cloud storage.

4. The shortlisting method as claimed in claim 1, wherein shortlisting the relevant information comprises manually selecting or dragging text on the user interface and then manually shortlisting the text.

5. The shortlisting method as claimed in claim 1, wherein the predefined domain represents IP address of remote website server.

6. The shortlisting method as claimed in claim 1, further comprising real-time tagging, comprising steps of:
   a. injecting an interface process, wherein the interface process is a program that interacts between a browser's background plug-in and a foreground website running on the same browser user interface, in order to process website data, detect relevant data and shortlisting; and
   b. a background process, as a program that runs within a runtime of the browser's plug-in, and handles core shortlisting actions from the website UI including saving shortlisted items, managing categories, configurations, options.

* * * * *